(12) United States Patent
Bojarski et al.

(10) Patent No.: US 9,103,295 B2
(45) Date of Patent: Aug. 11, 2015

(54) CURRENT CONTROLLER HAVING PROGRAMMABLE CURRENT-CONTROL PARAMETERS AND HARDWARE-IMPLEMENTED SUPPORT FUNCTIONS

(75) Inventors: Bernard J. Bojarski, Palatine, IL (US); Dirk Etzler, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 342 days.

(21) Appl. No.: 13/584,121

(22) Filed: Aug. 13, 2012

(65) Prior Publication Data

US 2014/0043000 A1    Feb. 13, 2014

(51) Int. Cl.
| | |
|---|---|
| F02M 37/04 | (2006.01) |
| F02D 41/26 | (2006.01) |
| F02D 41/20 | (2006.01) |
| G06F 9/445 | (2006.01) |

(52) U.S. Cl.
CPC ............... *F02D 41/26* (2013.01); *F02D 41/20* (2013.01); *F02D 2041/2058* (2013.01); *F02D 2041/2068* (2013.01); *G06F 9/44505* (2013.01)

(58) Field of Classification Search
CPC ......... F02D 41/24; F02D 41/00; F02D 41/20; G06F 9/44505; H01F 7/18
USPC .......... 323/283; 123/486, 498, 490–492, 480; 701/102, 115; 713/100; 709/203
See application file for complete search history.

(56) References Cited

U.S. PATENT DOCUMENTS

| | | | |
|---|---|---|---|
| 5,621,167 A * | 4/1997 | Fang-Cheng | 73/114.74 |
| 6,487,492 B1 | 11/2002 | Loucks | |
| 8,332,125 B2 * | 12/2012 | Boee et al. | 701/103 |
| 2003/0062029 A1 | 4/2003 | Oyama et al. | |
| 2005/0126543 A1 * | 6/2005 | Manzone et al. | 123/490 |
| 2008/0059039 A1 * | 3/2008 | Nakagawa et al. | 701/99 |
| 2009/0287393 A1 * | 11/2009 | Moller et al. | 701/103 |
| 2010/0170474 A1 * | 7/2010 | Yamaguchi | 123/339.12 |
| 2012/0097133 A1 | 4/2012 | Beer et al. | |

FOREIGN PATENT DOCUMENTS

| | | |
|---|---|---|
| DE | 19722015 A1 | 12/1998 |
| DE | 10147484 A1 | 4/2003 |
| DE | 102006003861 * | 8/2007 |
| EP | 1424478 A1 | 6/2004 |
| EP | 1536124 A1 | 6/2005 |
| EP | 2037109 A1 | 3/2009 |

OTHER PUBLICATIONS

Search Report dated Sep. 9, 2013, from corresponding GB Patent Application No. GB1306842.4.

* cited by examiner

*Primary Examiner* — Nguyen Tran
*Assistant Examiner* — Shahzeb K Ahmad

(57) ABSTRACT

A current-control profile may be built from a sequence of phases in which the current is controlled in a defined manner. The electrical behavior of these phases may be configured within a list, which contains one entry, or slot, for each phase and which may be stored in a memory device. The order for stepping through the list is not hard-wired into the control circuit. Instead, such an order is part of the configuration for each entry, or slot, itself. Each entry/slot contains the information about the next phase, or the next possible phases depending upon the occurrence of any trigger events. In this way, the list of entries/slots is linked dynamically by the configuration thereby allowing for generation, in a flexible way, of current profiles with different characteristics and different numbers of phases and sequences.

20 Claims, 9 Drawing Sheets

NON = 0 (Reverse Jumps Allowed)

| Phase Memory | | | | | | |
|---|---|---|---|---|---|---|
| Phase Number | Duration | Control Mode | Control Level | Control Parameters | Diagnostic Parameters | Next Phase |
| 000 | X | HYS | 1 | A,B,C | X,Y,Z | 003 |
| 001 | X | HYS | 2 | A,B,C | X,Y,Z | 002 |
| 002 | X | HYS | 3 | A,B,C | X,Y,Z | 999 |
| 003 | X | HYS | 4 | A,B,C | X,Y,Z | 001 |
| 999 | X | IDLE | 0 | | | 999 |

| Phase Memory | | | | | | |
|---|---|---|---|---|---|---|
| Phase Number | Duration | Control Mode | Control Level | Control Parameters | Diagnostic Parameters | Next Phase |
| 000 | X | HYS | 1 | A,B,C | X,Y,Z | 001 |
| 001 | X | HYS | 2 | A,B,C | X,Y,Z | 002 |
| 002 | X | HYS | 3 | A,B,C | X,Y,Z | 999 |
| 003 | X | HYS | 4 | A,B,C | X,Y,Z | 999 |
| 999 | X | IDLE | 0 | | | 999 |

CURRENT CONTROLLER HAVING PROGRAMMABLE CURRENT-CONTROL PARAMETERS AND HARDWARE-IMPLEMENTED SUPPORT FUNCTIONS

BACKGROUND

FIG. 1 shows an example of a prior art current-control profile having 8 current-control phases, namely, off, pre-charge, peak, clamp0, hold0, clamp1, hold1, and off. A control signal, referred to in FIG. 1 as NON, is also shown. The control signal is de-asserted (High) during the first and second off phases and is asserted (Low) during the other phases. As is the case for all of the signals discussed herein, the polarity (i.e., whether the signal is asserted when it is high or when it is low) of the control signal shown in FIG. 1 is not significant (i.e., the polarity could be reversed instead).

Two conventional control approaches are known for generating such current-control profiles.

A fixed state-machine approach, which typically provides limited flexibility. FIG. 2 shows a fixed state-machine 200 that controls electrical current supplied to the target device 202 in accordance with the prior art.

The sequence of current phases is hard-wired into the control circuit allowing configuration of the parameters of the built-in phases only. As used herein, the terms "hardwired" and "implemented in hardware" refer to control-unit functionality that is implemented through use of sequential logic units, featuring a finite number of gates that can generate specific results based on the inputs to the control unit. According to a fixed state-machine approach, possible current profiles are limited to the phases and sequences known at time of control circuit design. This approach shows a limited flexibility in terms of building new current profiles.

A micro-sequencer approach typically provides undefined safety behavior. FIG. 3 shows a micro-sequencer 300 that controls electrical current supplied to the target device 202 in accordance with the prior art.

The behavior of the control circuit is determined during run-time by means of a code sequence as in the case of a micro-controller (e.g. software-based approach). Since the behavior of the control circuit is based on software, it is difficult, and potentially impossible, to prove an appropriate operation under all circumstances, such as a deactivation of the solenoid after a specified time after the control signal is de-asserted. Further, in a micro sequencer-based implementation, individual functions, such as turn-on and turn-off of an NMOS (n-channel metal oxide semiconductor), comparing the injector current to defined thresholds, reacting if current thresholds are crossed, comparing phase time with defined set point, and reacting if phase time has elapsed, are normally implemented in embedded microcode, which is typically very complex but versatile. A shortcoming of this approach lies in its complexity. For example, a typical program sequence for threshold detection might be as follows: 1. Program the comparator reference to the desired value. 2. Set up and enable an interrupt to be triggered when the comparator level has been satisfied. 3. Push variables associated with this function onto a stack or otherwise store them for later retrieval. 4. Branch to a wait loop or resume other processing. 5. When the comparator interrupt has fired, branch to the interrupt processing routine. 6. Retrieve the variables associated with this function from their storage location. 7. Turn on (or off) the output associated with the current control channel. 8. From within the interrupt, flag that the comparator has tripped, so that a new phase may be entered by the main program if necessary. 9. Load a new comparator reference level for the next step in the current control loop. As this sequence demonstrates, testing and verification of a complex software/hardware system can be extremely difficult because the system is essentially unbounded and is capable of doing many different types of things, it has the potential of doing many different things incorrectly. Problems usually result when external events happen at exactly an inappropriate time, exactly in an inappropriate order, or both, which can be very difficult to simulate in testing. We have all seen cases of software "locking up," becoming confused, or generally causing issues in embedded systems (cell phones, tablets, GPS, etc.). While this behavior is merely annoying when your cell phone needs to be restarted, it can be catastrophic in the case of a controller for a vehicle fuel injection system.

The fixed state machine approach avoids these problems by following the same sequence every time, with no possibility for changes to the sequence. Relative to a micro sequencer-based approach, the fixed state machine type of system is much easier to verify and validate, because external events have much less influence. But this ease of testing and validation comes at the expense of versatility in that the fixed state machine is only capable of following the sequence it was designed for. So any sequence changes need to be provided for at the time of the control circuit design.

A current-control circuit, also referred to herein as a current controller, that overcomes the shortcomings mentioned above would advance the state of the art.

BRIEF SUMMARY

In accordance with embodiments of the invention, a current-control profile may be built from a sequence of phases in which the current is controlled in a defined manner. The electrical behavior of these phases may be configured within a list, which contains one entry, or slot, for each phase and which may be stored in a memory device. The order for stepping through the list is not hard-wired into the control circuit. Instead, such an order is part of the configuration for each entry, or slot, itself. Each entry/slot contains the information about the next phase, or the next possible phases depending upon the occurrence of any trigger events. In this way, the list of entries/slots is linked dynamically by the configuration thereby allowing for generation, in a flexible way, of current profiles with different characteristics and different numbers of phases and sequences.

DETAILED DESCRIPTION

Figure 1:
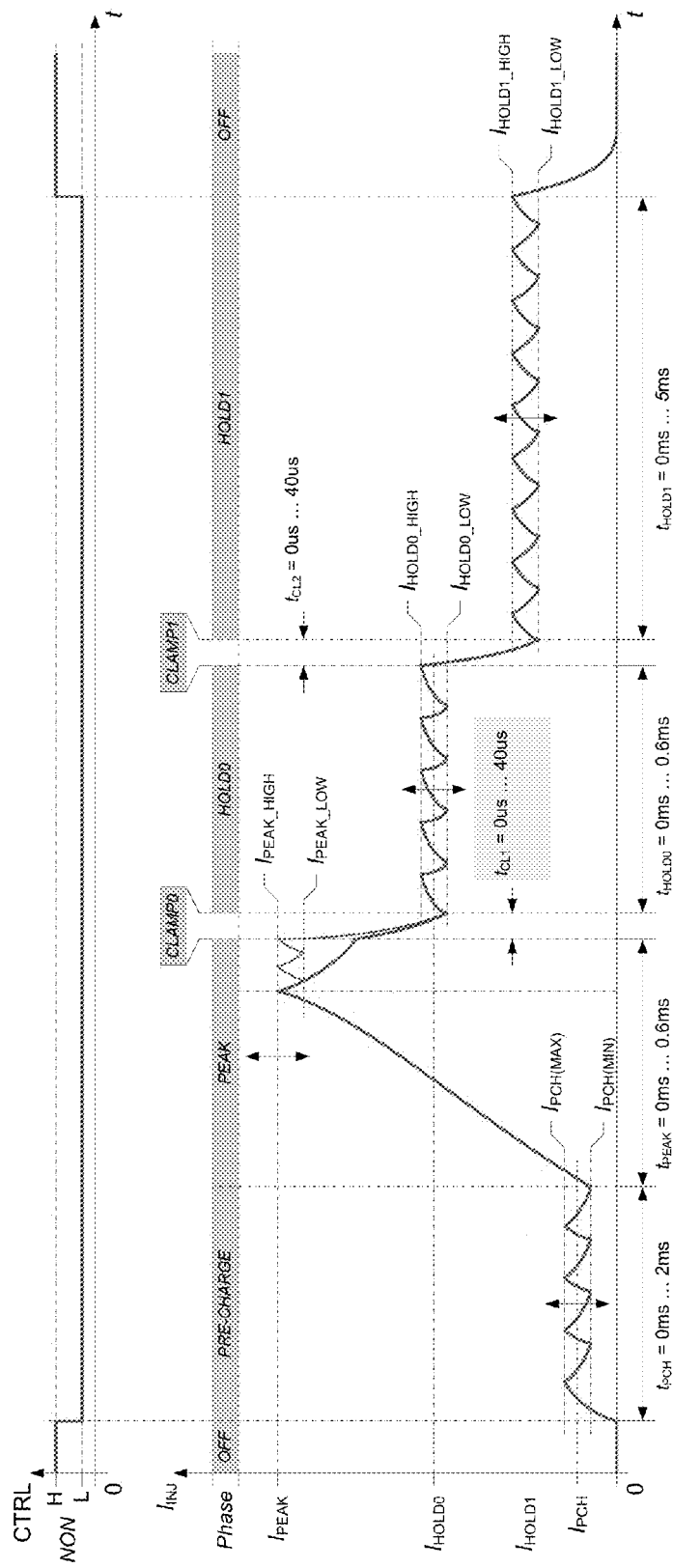
FIG. 1 shows a prior-art current-control profile.
Figure 2:
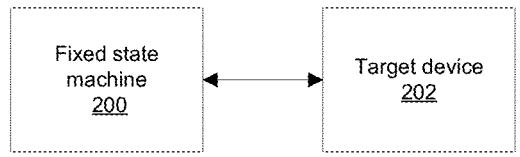
FIG. 2 shows a prior-art fixed-state-machine-based current-control circuit.
Figure 3:
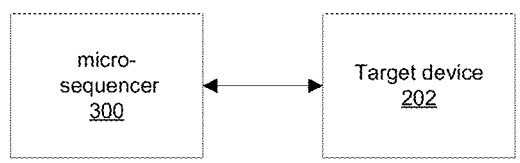
FIG. 3 shows a prior-art micro-sequencer-based current-control circuit.

Various embodiments are discussed in the context of controlling current supplied to solenoid actuators for automotive fuel injectors. But embodiments of the invention may also be used for controlling current to other types of devices, including, but not limited to: solenoid actuators for intake and exhaust valves, high pressure fuel pumps (HPFP), direct inlet valves (DIV), or any load requiring that a specific sequence of controlled currents be generated for proper control Solenoid actuators for injection valves or intake valves are operated by driving a current according to a specified profile through the coil. Depending on the targeted solenoid actuator, significant differences exist in the applied current profiles. FIG. 1 show an example current profile which may be used for solenoid actuators driving fuel-injection valves.

Such a current profile may be built from a sequence of current control phases (e.g. "snippets", or sub-sections of the overall profile) which differ in their control parameters. These control parameters include, but are not limited to: the values of the lower and the upper current set point, the duration of the phase, the supply voltage for the phase, and the termination criteria for the phase. In order to support as many solenoid actuators as possible with one control circuit, a high degree of flexibility for building these current profiles is desirable.

Since "injection" is considered a torque-relevant path within a combustion engine control system, the operation of the injection path is safety relevant. Independent of the programmed current profile, the solenoid activation has to be terminated after a known specified duration when the control signal is de-asserted (e.g. no current flowing through the solenoid actuator and injection valve closed). This requirement adds restrictions on the flexibility of the current profile generation.

Embodiments of the invention resolve the conflict between the desirability of high current profile flexibility and being able to guarantee termination of any solenoid activation after a given specified time.

Embodiments of the invention are based on the idea that a current-control profile can be built from a sequence of phases in which the current is controlled in a defined manner. The electrical behavior of these phases may be configured within a list, which contains one entry, or slot, for each phase and which may be stored in a memory device. The order for stepping through the list is not hard-wired into the control circuit. Instead, such an order is part of the configuration for each entry, or slot, itself. Each entry/slot contains the information about the next phase, or the next phases. In this way, the list of entries/slots is linked dynamically by the configuration thereby allowing for generation, in a flexible way, of current profiles with different characteristics and different numbers of phases and sequences.

Figure 4:
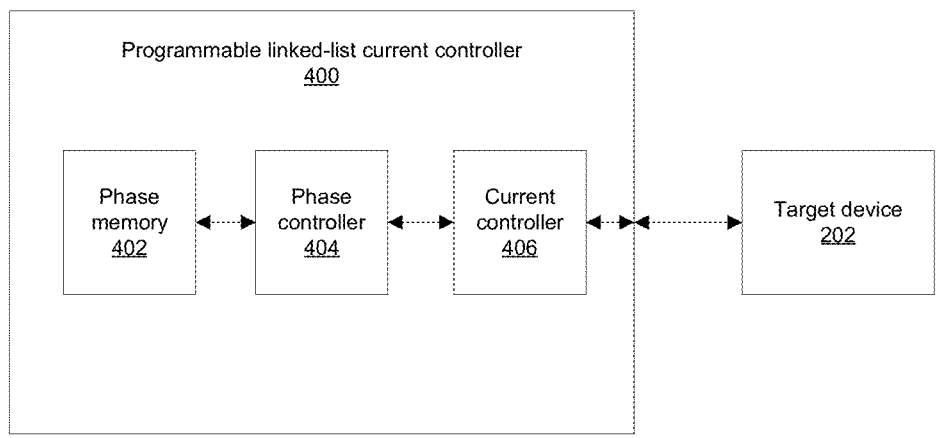
FIG. 4 shows a programmable linked-list current controller in accordance with embodiments of the invention.

FIG. 4 shows a programmable linked-list current controller 400 in accordance with embodiments of the invention. The controller 400 includes a phase memory 402, a phase controller 404, and a current controller 406, which controls electrical current supplied to a target device 202, which may be a solenoid actuator for a fuel injector or any other type of device or system to which a controlled electrical current is to be supplied.

The phase memory 402 may include some number of individual records, also referred to as entries or slots, for phases of a current-control profile, or sequence. The slots or entries of this type are analogous to instances, or rows, of data in a database table in that each individual entry, or slot, is a collection of information related to a single conceptual entity, which, in the context of embodiments of the invention, is a phase of a current-control profile, or sequence of current-control phases.

Each slot may be unique and is identified by a phase number. Each slot may contain sufficient information for implementing a current control scheme for a specific phase in the sequence. This information may include, but is not limited to, the duration of the phase (in time), the current control mode to be implemented in the phase, the level or levels of current to be programmed, and any other applicable parameters depending on the specific control mode, various parameters and settings used in diagnostic analysis, and the like. Examples of the types of current-control information that may be specified include, but are not limited to specifying that a phase: (1) uses a battery or a boost supply; (2) may use hysteretic control, timed control, or a mix of both; and (3) is time-linked to its successor phase to implement timed sequences of phases.

Each slot also includes next phase information, which is used to identify a phase to be executed after the currently executing phase has terminated. As will be discussed in more detail below, the next phase information may comprise one or more next phase pointers, one of which may specify a next phase in the event that no trigger event occurs during execution of the present phase, and one or more additional next phase pointers, each of which may specify a next phase in the event that one or more corresponding trigger events occurs during execution of the present phase.

The phase controller 404 retrieves current phase information stored in the phase memory 402 and processes it for use by the current controller 406. The phase controller also controls and keeps track of phase timing and other sources of phase termination. The phase controller holds the phase information, determines when it should retrieve information about the next phase, and retrieves the next-phase information in accordance with that determination, as is discussed in more detail in connection with FIG. 5.

The current controller 406 implements the current control scheme as commanded by the phase controller and maintains the current level as instructed by the phase controller.

The programmable linked-list current controller 400 provides different types of functionality, including: current-control functionality and basic support functionality. According to embodiments of the invention, the current-control functionality, including the sequencing duration and other parameters of current-control phases, is programmable in the sense that it can be configured by specifying values in the phase memory 402, as is demonstrated in several examples, which are discussed below. Types of functionality other than the types of current-control functionality that can be programmed via values specified in the phase memory are referred to herein as basic support functionality, which, according to embodiments of the invention, is implemented in hardware. Examples of basic support functionality performed by the current controller 406 include, but are not limited to: comparing the supplied current to defined thresholds and reacting if the current thresholds are crossed. Examples of basic support functionality performed by the phase controller 404 include, but are not limited to: comparing phase time with a defined set point and reacting if the phase time has elapsed.

Figure 5:
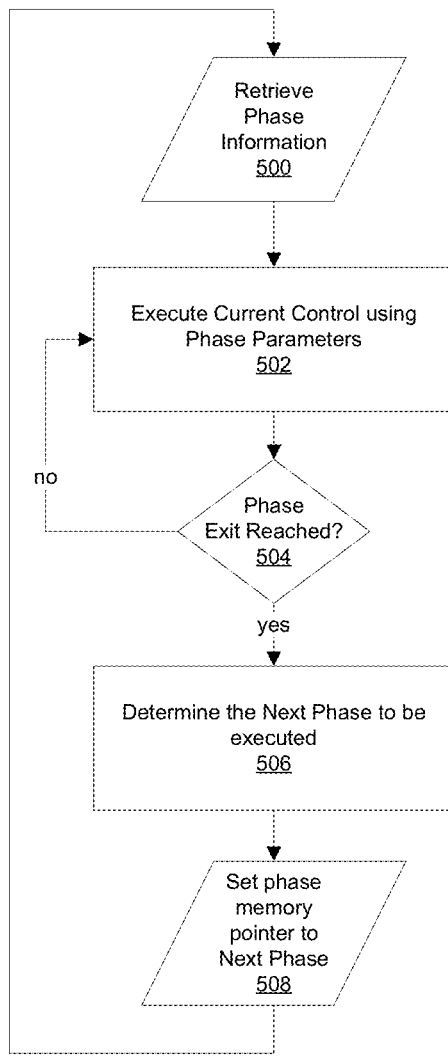
FIG. 5 shows steps performed by a programmable linked-list current controller in accordance with embodiments of the invention.

FIG. 5 shows steps in accordance with embodiments of the invention. Phase information is retrieved from the phase memory, as shown at 500. Current control is executed using phase parameters in the retrieved phase information, as shown at 502. A determination is made with respect to whether a present, or current, phase has finished execution, as shown at 504. If execution of the present or current phase has not yet ended, the no branch from 504 is followed, and step 502 is then performed. Otherwise, if execution of the present or current phase has ended, the yes branch from 504 is followed, and a next phase to be executed is determined, as shown at 506, and a phase memory pointer may then be set to point to a next phase, as shown at 508.

Figure 6:
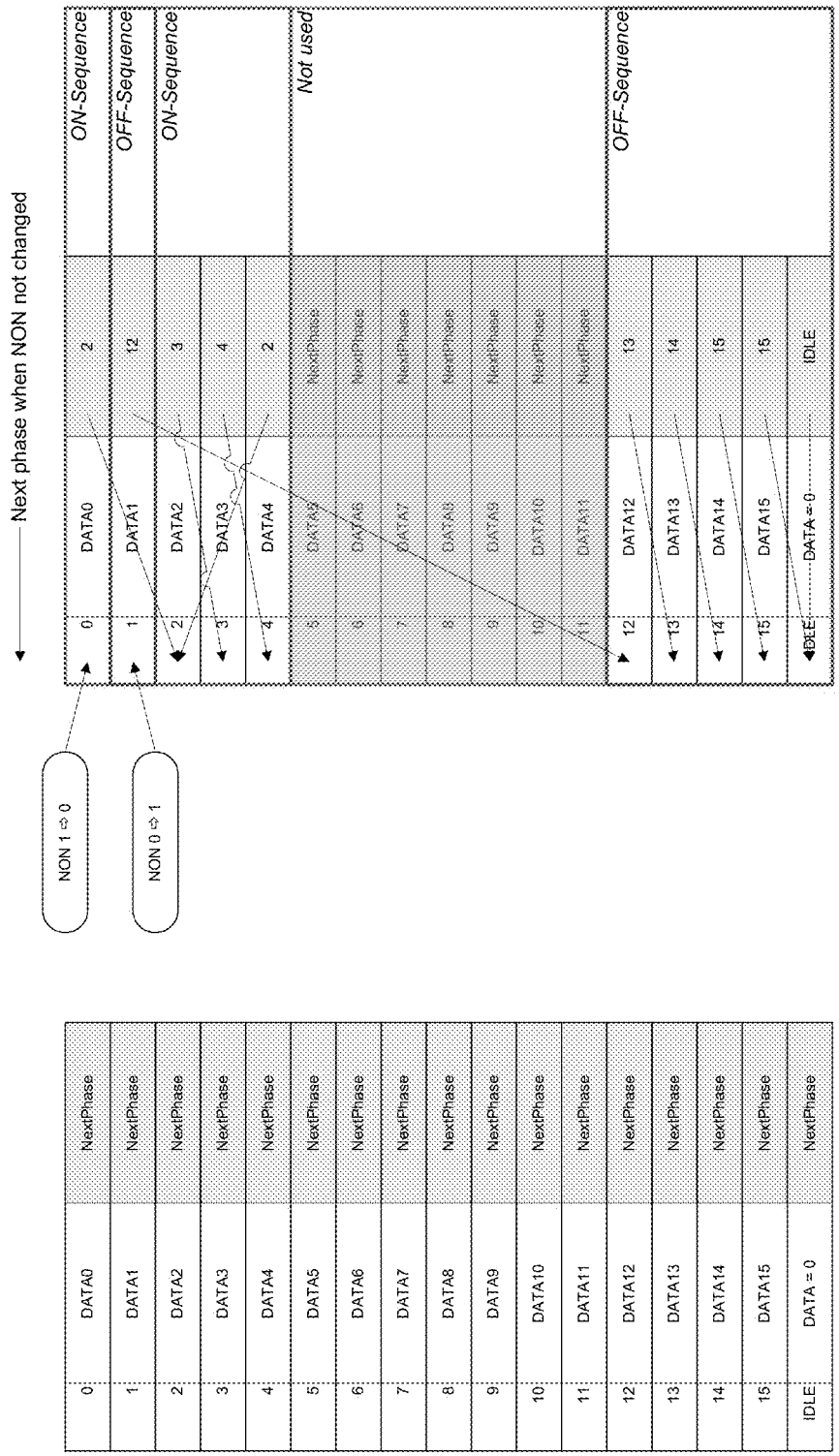
FIG. 6 shows example current-control-phase sequences in accordance with embodiments of the invention.

FIG. 6 shows two current-control sequences, or profiles, which are referred to in FIG. 6 as ON-Sequence and OFF-Sequence. Each of the sequences includes one or more current-control phases and is specified by a corresponding plurality of phase-memory slots, in accordance with embodiments of the invention. As shown, each of the sequentially numbered slots 0-15 contains its own set of parameters (referred to as DATA0-DATA15 in FIG. 6) for configuring the current-control phases. At least some of the values of the parameters for any given slot will typically vary from the values of the parameters for the other slots.

Each slot shown in FIG. 6 also contains information about its subsequent state. This type of information may also be referred to as a next phase pointer. The information about the subsequent state, or next phase, may be divided into 2 or more separate pointers. For example, for each slot, one pointer (e.g. NextON) may contain information about the next phase, or state, in case a control signal is asserted (NON=0, depicted in FIG. 7 by the arrows drawn with solid lines). The second pointer (e.g. NextOff) may contain information about a next phase, or state, in case the control signal is de-asserted (NON=1, depicted in FIG. 7 by arrows drawn with dashed lines).

Additional sets of next phase pointers may be used for corresponding additional sources of trigger events. Each additional next phase pointer of this type may specify a next phase in case a particular trigger event occurs. In accordance with embodiments of the invention, as is discussed in more detail below, phase sequences progress with increasing phase IDs while the control signal is de-asserted.

In this way, embodiments of the invention allow building sequences of current control phases for control signal asserted as well as control signal de-asserted (e.g. for needle seat detection algorithms). Needle-seat-detection algorithms relate to estimating the actual opening and closing of a fuel injector's injection valve. Since the mechanical signals are not easily available, estimation is performed based on the electrical signals (e.g. injector current or injector voltage). In order to evaluate these signals appropriately, the control driver circuit is typically set in a defined operation mode, such as current-control phases with de-asserted control signals. In the past, current control was typically performed with the control signal asserted. More recently, defined current control may be performed with the control signal de-asserted.

According to various embodiments, dedicated entry points into the list (blocks 0 and 1) of phases exist based on the state of the control signal, NON. An additional dedicated state, IDLE, exists in which the control circuit does not supply electrical current. In embodiments of the invention, current-control phases that are performed while the control signal is de-asserted progress toward the IDLE state, without any loops being allowed, in a manner similar to that in which a monotonically increasing mathematical function increases only and does not decrease. The IDLE phase may be referred to as a "safe" state that prevents supplying current to the target device 202.

With the control signal asserted, each phase-memory slot may reference itself as the next slot thereby allowing a potentially infinite duration of any particular phase. Similarly, while the control signal is asserted, each slot may also jump back to a previous phase thereby repeating a sequence of current-control phases. In both cases, such phase sequences may be terminated by de-asserting the control signal. With the control signal de-asserted, any reference to a list entry/slot with an ID that is smaller, or equal to, the present phase ID is not allowed. Instead, only forward jumps (e.g., jumps to next phases having a phase number that is higher than the present phase) are allowed. This forces the control circuit to head toward, and end up in, the IDLE state, by preventing the control circuit from continuing to repeatedly execute one or more phases in an execution loop.

In the first sequence shown in FIG. 6, ON Sequence, the control signal, NON is asserted. Starting with the entry point, Slot #0, the following slots are executed: Slot #0→Slot #2→Slot #4 using the next-phase information. The next phase information for Slot #4 references Slot #2, thereby creating a potentially infinite loop, which can be terminated by de-asserting the control signal, NON, from 0 to 1.

The second sequence is shown in FIG. 6 as OFF Sequence in which the control signal NON=1. Starting with the entry point, Slot #1, the following slots are executed: Slot #1→Slot #12→ . . . →Slot #15→IDLE using the next phase information. Forward jumps (i.e., next pointer references to a slot having a slot number that is greater than a present slot) are allowed. But backward jumps (i.e., references to a slot having a slot number that is less than a present slot) and jumps to a same slot (i.e., references to a slot having a slot number that is the same as a current slot) are not allowed. In accordance with embodiments of the invention, any phase information that attempts a backward jump, or a jump to the same slot, while the control signal is de-asserted, results in a jump to the IDLE state. Jumps to the IDLE state of this type may be implemented in hardware and can, therefore, be validated.

In the example shown in FIG. 6, every slot has the same next-phase information for when the control signal, NON, changes from its current state. Regardless of what the present phase is, if NON transitions from 1 to 0, the next phase will be phase 0, and if NON transitions from 0 to 1, the next phase will be phase 1. Under such circumstances, phases 0 and 1 may be referred to as dedicated entry points into the ON-Sequence of FIG. 6 and into the OFF-Sequence of FIG. 6, respectively. Dedicated entry points of this type may be triggered by dedicated events, such as transitions of a control signal. The same type of behavior may also be implemented with dedicated NextON and NextOFF phase pointers for each phase, as is shown in the example of FIG. 7.

Figure 7:
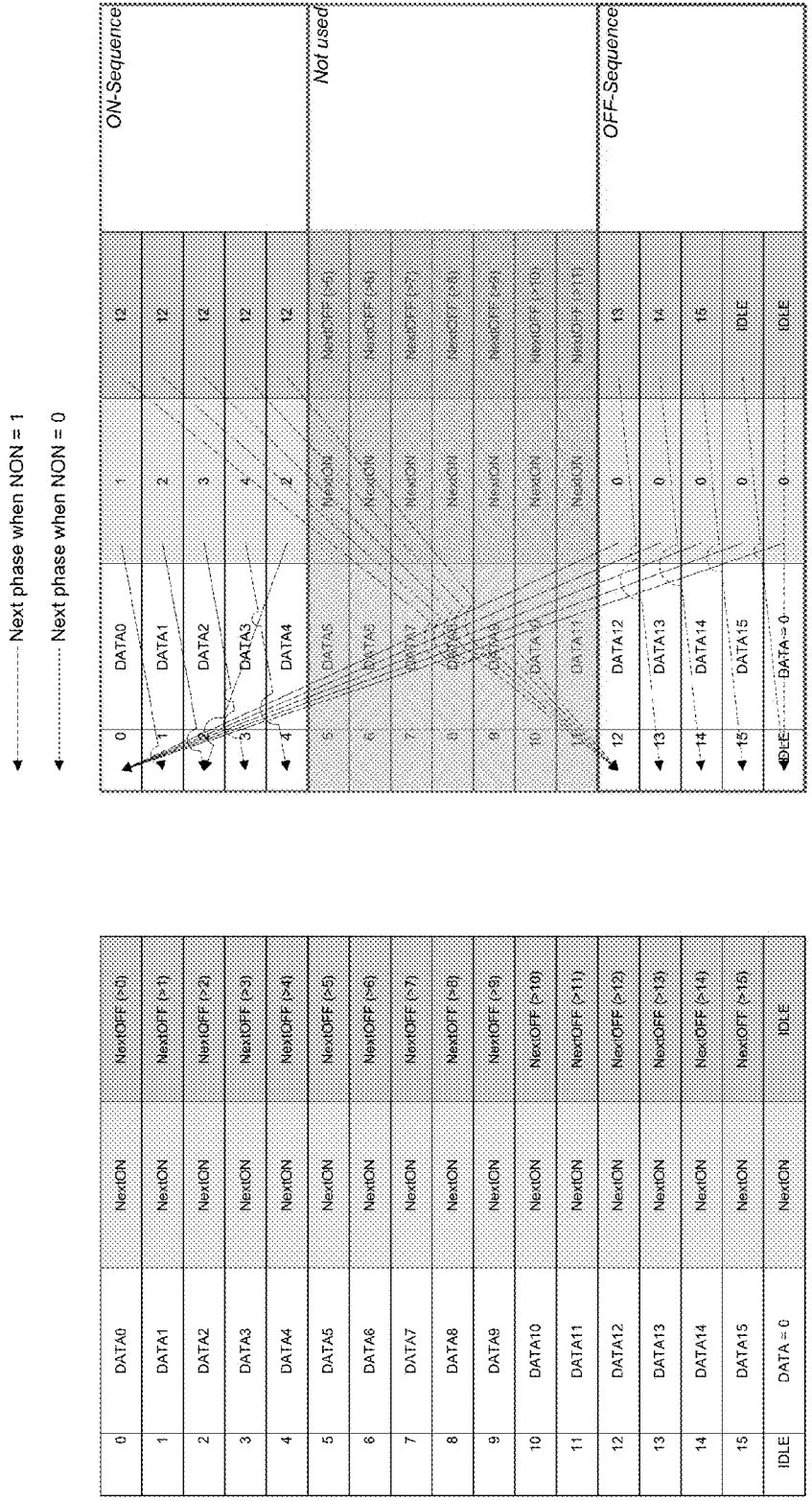
FIG. 7 shows additional example current-control-phase sequences in accordance with embodiments of the invention.

FIG. 7 shows another possible scenario, in accordance with embodiments of the invention, which uses list entries/slots to build various current control sequences.

As shown in FIG. 7, when the control signal is asserted, Slot #0 is entered through the NextON pointer list. This slot has a NextON pointer that points to Slot #1, which is the next slot to be executed as long as the control signal remains asserted. Similarly, execution of Slot #2 will follow execution of Slot #1, execution of Slot #3 will follow execution of Slot #2 and execution of Slot #4 will follow execution of Slot #3. The sequence Slot #2→Slot #4 is repeated as long as the control signal remains asserted.

While any of the slots in the NextON pointer list are being executed, once the control signal is de-asserted, Slot #12 is entered through the NextOFF pointer list. This slot has a NextOFF pointer that points to Slot #13, which is the next slot to be executed, after Slot #12, as long as the control signal remains de-asserted.

Similarly, execution of Slot #14 will follow execution of Slot #13, execution of Slot #14 will follow execution of Slot #13, execution of Slot #15 will follow execution of Slot #14, and then repeated execution of Slot IDLE will occur as long as the control signal remains de-asserted.

Dedicated pointers for other types of trigger events are also possible. In accordance with embodiments of the invention, each slot may have dedicated, separate next phase pointers corresponding to different trigger events (e.g. control signal being asserted, control signal being de-asserted, one or more current profile selection signals being asserted, one or more current profile selection signals being de-asserted, and the like). This allows the path through the linked list to be altered in response to the occurrence of different trigger events. In this way, various types of trigger events, for which current control should deviate from its "normal" sequence, may be handled. For example, a failure event, such as a "lost" current feedback event, could be one such trigger event. To allow a specified behavior even under such an exception, the current profile parameters that get used may be specified in a current-control phase, or a sequence of current-control phases, that is pointed to by a next phase pointer for this type of trigger event (i.e., a lost current feedback event). Under such circumstances, hysteretic current control could be replaced by a pre-calculated duty-cycle mode, thereby eliminating a need for current feedback for the rest of the current profile sequence.

Programming examples will now be discussed to demonstrate aspects of various embodiments of the invention.

Figures 8A, 8B:
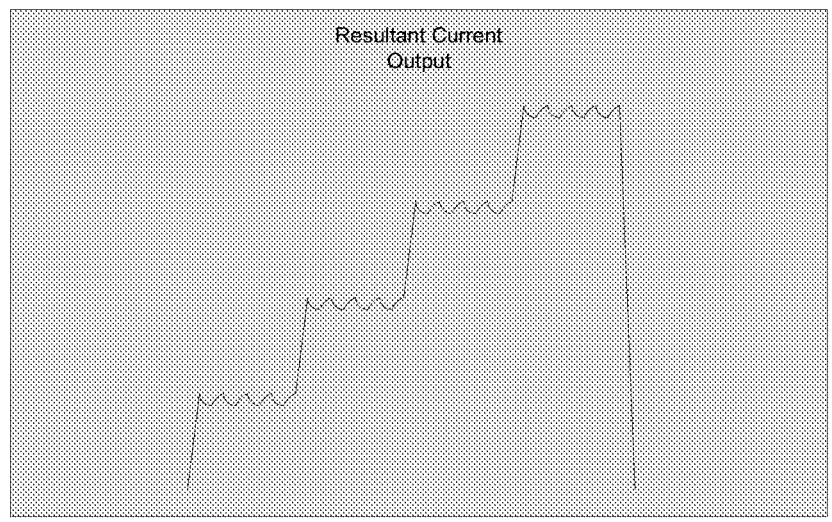
FIGS. 8A and 8B show example phase-memory contents and the corresponding resultant current outputs in accordance with embodiments of the invention.

In FIG. 8A, an example current-control profile is shown in slots 000-003 of the phase memory. Phase 000 commands a current control level of 1 for a duration X. It then links to slot 001, as indicated by the Next Phase entry. Similarly, slot 001 commands a current control level of 2, also for duration X. It then links to slot 002. Slot 002 commands a current control level of 3, also for a duration of X. It then links to slot 003. Finally, slot 003 commands a current control level of 4 for the same duration of X. It links to slot 999. Slot 999 is defined as the "idle" state, or the state where no current-control activity takes place.

A representation of the resultant current profile is shown in FIG. 8B. Note the "stepped" current level as programmed in the phases in sequence. Hysteretic current control is applied at level=1, followed by level=2, followed by level=3, followed by level=4, followed by no activity, or "idle".

Figures 9A, 9B:
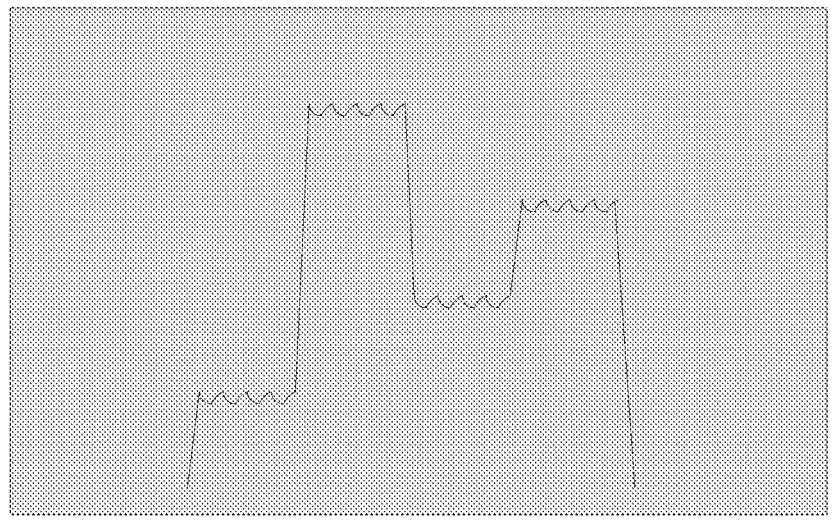
FIGS. 9A-B, 10A-B, and 11A-B show additional example phase-memory contents and the corresponding resultant current outputs in accordance with embodiments of the invention.

Some of the flexibility allowed in accordance with embodiments of the invention is shown in FIGS. 9A and 9B. Note that the phase memory slots shown in FIG. 9A are the same as in FIG. 8A, except for the Next Phase entries. Simply by altering these entries, the sequence of phase control can be altered as shown in FIGS. 9A and 9B. In this case, slot 000 links to slot 003. Slot 003 then links back to slot 001. The resulting current profile is shown in FIG. 9B. Current level 1 is followed by current level 4, then current level 2, then current level 3, and finally the idle condition.

This is a simple example. But, in this way, highly complex waveforms may be implemented by relatively simple programming of the phase memory. Changes in sequencing can also be implemented simply and quickly in accordance with embodiments of the invention.

Note that in the example shown in FIGS. 9A and 9B, the control signal, NON, is asserted or active, meaning that current control is "on" and reverse phase jumps are allowed.

Figure 10A:
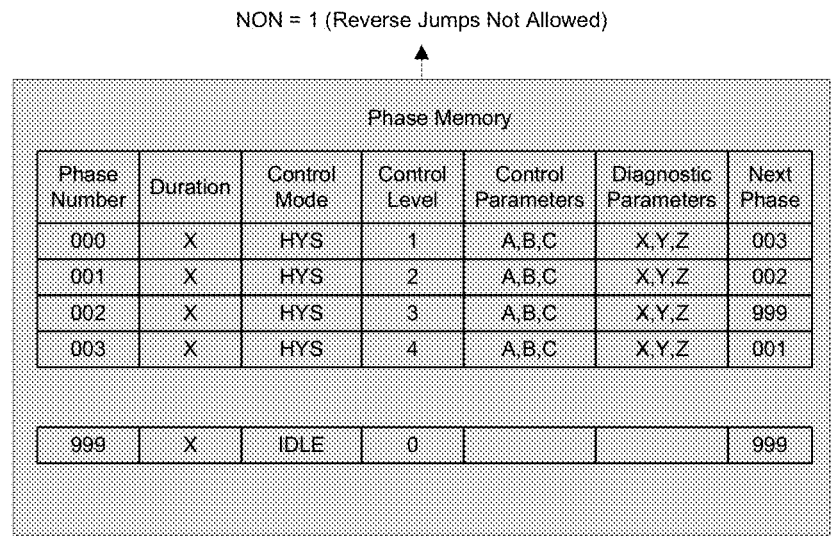
Figure 10B:
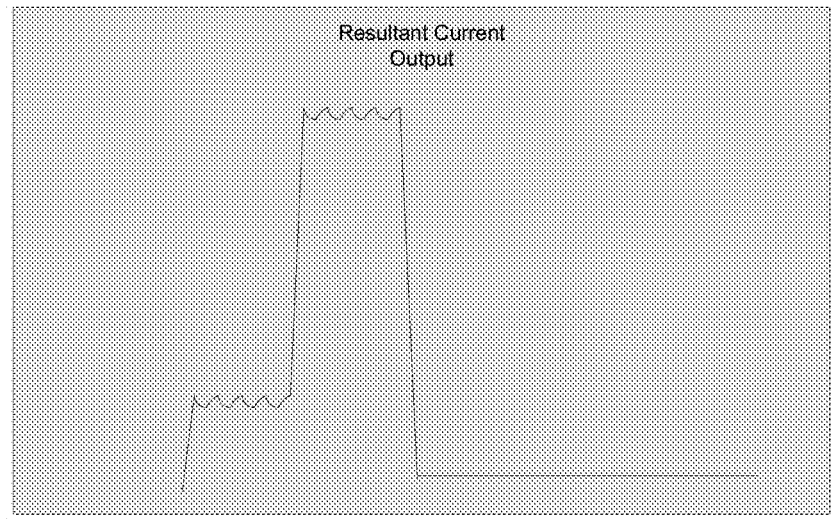

In FIGS. 10A and 10B, the same phase configuration is presented, but this time the control signal, NON, is de-asserted or inactive. In this situation, reverse phase jumps are not allowed, and the resulting current profile is shown in FIG. 10B. Slot 000 is executed first at current level 1, followed by slot 003 at current level 4. Slot 003 links to slot 001. But this "reverse jump" is not allowed in this situation because the NON signal is de-asserted. Therefore, the idle state is entered directly from slot 003.

Similarly, once the control signal has been de-asserted, execution of any additional phase memory slots will proceed directly toward the idle state. As such, endless loops will not prevent the system from arriving at an idle, or safe, state when the control signal is de-asserted.

Figures 11A, 11B:
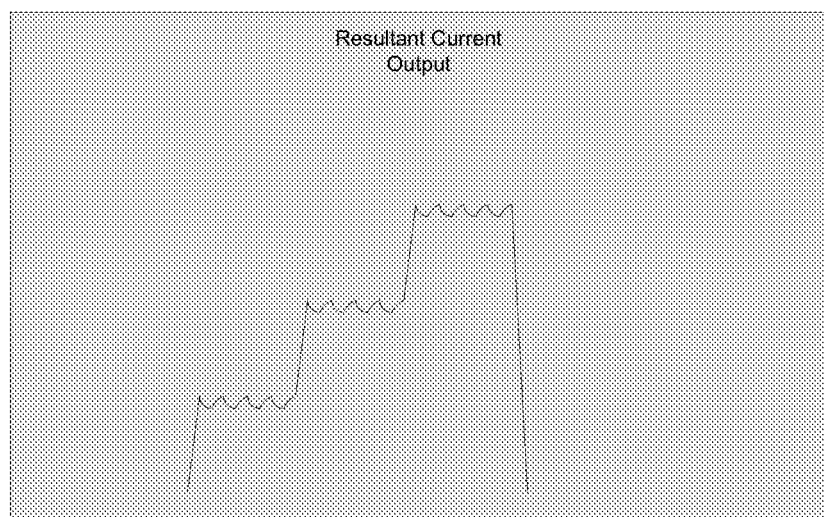

FIGS. 11A and 11B show another simple alteration to the phase memory and the resultant current profile. By linking slot 002 to the idle phase, slot 003 is bypassed. In accordance with embodiments of the invention, phase memory need not be fully utilized, nor do slots executed sequentially need to be contiguous.

Embodiments of the invention in which the level of configuration is in between a conventional fixed state-machine approach and a conventional micro-sequencer approach have been disclosed. In these embodiments, programming is limited to configuring high-level functions, such as the behavior of the current controller or the phase controller. The functionality of basic functions is hard-wired into the control circuit (i.e., implemented in hardware and not subsequently programmable).

Since the list entries/slots can be linked together at run-time and can be used for each of the sequences, the memory space for the list entries/slots is used efficiently. Slots that are not used for a current-control profile do not need to be configured. Slots not used in the control-signal-asserted state are available for use in the de-asserted state, and vice-versa. This is an advantage over the conventional fixed-state-machine approach.

Since the control engines, namely, the phase controller and the current controller, of the circuit are still "hard-wired," the response times to an external event can be reduced and can be made deterministic in the sense that, for any given input, the expected output can be predicted with certainty, as opposed to a non-deterministic system in which the output cannot be predicted because there are multiple possible outcomes for any particular input. In the case of the micro-sequencer approach, due to the sequential instruction flow and interrupt latencies inherent in processing, response times can only be predicted within relatively wide tolerances, leading to a higher jitter of the output control signals.

The ability to validate and prove that the control circuit reaches the IDLE state under all circumstances and configurations is an advantage over the more flexible micro-sequencer approach. A control circuit in accordance with embodiments of the invention does not need an overlaying instance which monitors its behavior. This reduces cost and complexity of the overall design.

Since the data which has to be provided for the list entries/slots are a "description" of the phases for a current profile, the current-control circuit is easier and faster to configure than the micro-sequencer approach, which typically uses a dedicated instruction set. Thus, no knowledge of software structures and programming is needed to configure a control circuit in accordance with embodiments of the invention. This reduction in complexity is similar to the reduction in complexity achieved by using a high-level procedural computer-programming language (e.g., c, c++, Pascal) vs. machine language coding of the same behavior.

Embodiments of the invention provide flexibility where required at the sequencing level, and also provide advantages of fixed-state-machine operation at the current-control level. Such an approach can be thought of as having "hard-coded subroutines" implemented via hardware, while allowing precise control of the phase sequencing in a more flexible way, which can be programmed in a less complex way relative to known prior art techniques.

The invention is not limited to the particular embodiments described herein. Many modifications in addition to those already described are possible without departing from the disclosed inventive concepts. The terminology used is for describing particular embodiments, and is not intended to be limiting. Instead, the scope of the invention is limited only by the appended claims.

The invention claimed is:

1. Apparatus comprising:
    a phase memory configured to store a plurality of current-control phase entries, the phase entries being records stored in the phase memory, wherein content of each phase entry specifies, for a corresponding current-control phase, current-control parameters and wherein each phase entry additionally includes a pointer that identifies a next phase entry and corresponding current-control parameters, the plurality of current-control phase entries and their associated pointers forming a linked list;
    a phase controller that is configured to retrieve from the phase memory a present phase entry, wherein the phase controller is configured to determine a next phase to be executed upon completion of execution of the current-control parameters obtained from the present phase entry, and based on a current-control signal and the pointer associated with the present phase entry, wherein the phase controller is hardwired to prevent execution of one or more loops of phases while the current control signal is de-asserted; and
    a current controller that is configured to control current supplied to a target device in accordance with the current-control parameters of the retrieved present phase entry, whereby potentially endless loops of current-control-phase sequences are prevented while the current-control signal is de-asserted.

2. The apparatus of claim 1, wherein phase entries forming the linked list follow an order of execution and wherein the order of phase entry executions is determined by the pointers associated with each phase entry.

3. The apparatus of claim 1 wherein the pointer specifies a next phase in the event that no trigger event occurs during execution of the present phase.

4. The apparatus of claim 3, wherein the next phase information comprises one or more additional next phase pointers each of which corresponds to a respective trigger event.

5. The apparatus of claim 4, wherein the phase controller is hardwired to prevent execution of one or more loops of phases while the current control signal is de-asserted by:
    (1) overriding any attempted reverse-phase jumps while the current control signal is de-asserted with a jump directly to an idle state in which no current is supplied to the target device; and
    (2) overriding any attempted same-phase jumps while the current control signal is de-asserted with a jump directly to the idle state.

6. The apparatus of claim 1, wherein next phase information for a plurality of current-control phase entries specifies a single dedicated entry point to be entered in response to a transition of the current control signal.

7. The apparatus of claim 1, wherein each of the current-control phase entries specifies a duration, a current-control mode, and a current level for the corresponding current-control phase.

8. The apparatus of claim 1, wherein the plurality of current-control phase entries includes an idle state during which no current is supplied to the target device.

9. The apparatus of claim 1, wherein a control-signal-off next-phase pointer of the retrieved present phase entry is configured to prevent execution of loops of current-control-phase sequences.

10. The apparatus of claim 9, wherein a control-signal-on next-phase pointer of the retrieved present phase entry is configured to allow execution of loops of current-control-phase sequences.

11. The apparatus of claim 10, wherein a control-signal-on next-phase pointer of the retrieved present phase entry is configured to allow repeated execution of the present phase entry.

12. The apparatus of claim 1, wherein the phase controller and the current controller both have basic support functionality implemented in hardware.

13. A method comprising:
    storing a plurality of current-control phase entries in a phase memory, wherein each phase entry in the phase memory comprises a record, content of which specifies, for a current-control phase, current-control parameters and next-phase information, the next-phase information being determined from a pointer associated with the current-control phase entry, the pointer identifying a current-control phase entry to be executed upon completion of the execution of the current-control phase entry;
    retrieving from the phase memory a present phase entry and determining a next phase to be executed from the pointer associated with the present phase entry, upon completion of execution of the present phase entry, based on a current-control signal and the next-phase information of the retrieved present phase entry, wherein execution of one or more loops of phases is prohibited by hardware while the current control signal is de-asserted; and
    controlling current supplied to a target device in accordance with the current-control parameters of the retrieved present phase entry, whereby potentially endless loops of current-control-phase sequences are prevented while the current-control signal is de-asserted.

14. The method of claim 13, wherein execution of the phase entries forming the linked list follows an order of execution and wherein the order of phase entry executions is determined by next phase pointers associated with each phase entry.

15. The method of claim 14, wherein the next phase pointer specifies a next phase in the event that no trigger event occurs during execution of the present phase.

16. The method of claim 15, wherein the next phase information comprises one or more additional next phase pointers each of which corresponds to a respective trigger event.

17. The method of claim 16, wherein execution of one or more loops of phases is prohibited by hardware while the current control signal is de-asserted by:
    (1) overriding any attempted reverse-phase jumps while the current control signal is de-asserted with a jump directly to an idle state in which no current is supplied to the target device; and
    (2) overriding any attempted same-phase jumps while the current control signal is de-asserted with a jump directly to the idle state.

18. The method of claim 13, wherein next phase information for a plurality of current-control phase entries specifies a single dedicated entry point to be entered in response to a transition of the current control signal.

19. The method of claim 13, wherein each of the current-control phase entries specifies a duration, a current-control mode, and a current level for the corresponding current-control phase.

20. The method of claim 13, wherein the plurality of current-control phase entries includes an idle state during which no current is supplied to the target device.

* * * * *